The present invention relates to a welding method and assembly, and more particularly to a new and novel technique for facilitating the welding of tubing onto a plate or a like surface.

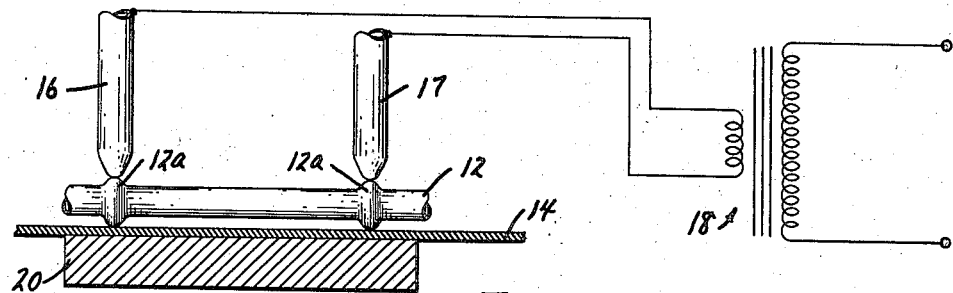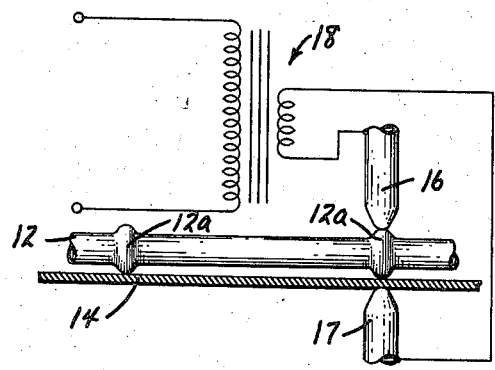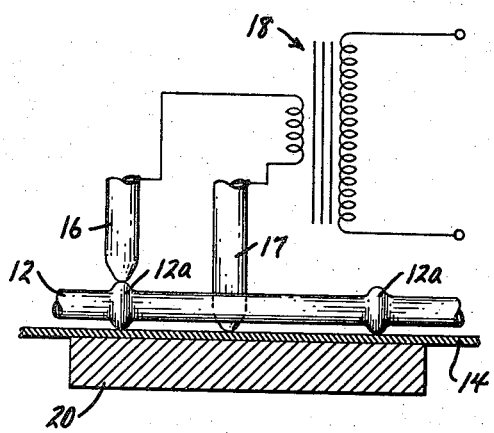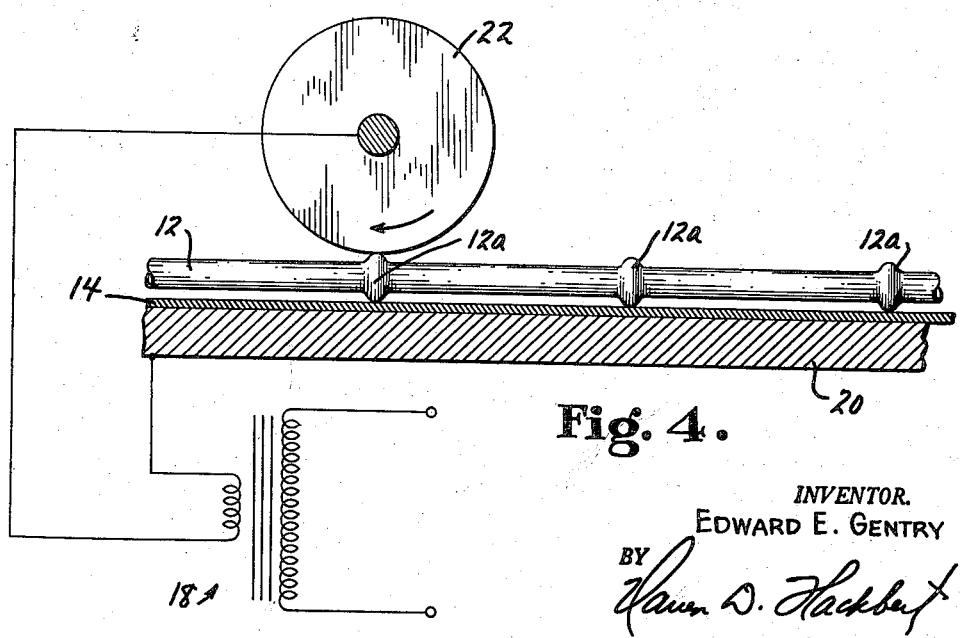
Fig. 1.
Fig. 2.
Fig. 3.
Fig. 4.
INVENTOR.
EDWARD E. GENTRY 3,104,312
WELDING METHOD AND ASSEMBLY
Edward E. Gentry, 6430 Newburg Road,
Vanderburgh County, Ind.
Filed Apr. 19, 1961, Ser. No. 104,020
4 Claims. (Cl. 219—107)

As is known, it is desirable to achieve a tube-to-plate weld having a maximum heat transfer, a minimum of marking on the outer surface of the plate, and, at the same time, through a welding operation which does not require the use of extra components for the assembly. With prior welding techniques, as, for example, in heat exchanger applications, such as in warm wall refrigerators and freezers, it has been difficult, if not impossible, to weld tubing onto the inner surface of the plate defining the unit shell without a mark becoming apparent on the outer surface of the plate. Additionally, these prior welding techniques mostly utilize clips, adhesives and/or other extra parts for the assembly operation.

By virtue of the instant invention, the applicant has provided a new and novel method and assembly for welding tubing onto plates, or like surfaces, where such method and assembly produces good bonding with a maximum heat transferability, a minimum of marking on the outer surface of the plate, and a ready welding operation without the use of additional components. Broadly, the aforesaid desirable results are achieved through the use of tubing having upset portions or projections disposed along its length, where such projections form a part of the current path during a subsequent welding operation.

Accordingly, the principal object of the present invention is to provide a new and novel method and assembly for welding tubing onto plates.

Another object of the present invention is to provide a new and novel welding method and assembly for tubing-to-plate applications which produce good bonding and a maximum heat transfer between the tubing and plate.

A still further object of the present invention is to provide a new and novel welding method and assembly which minimizes the possibility of marks appearing on the outer surface of the plate onto which tubing has been welded.

A further and more general object of the present invention is to provide a new and novel welding method and assembly which requires no added components and which, at the same time, is readily carried out with optimum results.

Other objects and a better understanding of the invention will become apparent from the following description, taken in conjunction with the accompanying drawing, wherein FIG. 1 is a generally schematic representation of a welding technique in accordance with the instant invention;

FIG. 2 is a generally schematic representation of a modified welding technique in accordance with the applicant's invention;

FIG. 3 is a generally schematic representation of another modified welding technique forming a part of the instant invention; and, FIG. 4 is a generally schematic representation of still another modified welding technique in accordance with the instant invention.

For the purposes of promoting an understanding of the principles of the invention, reference will now be made to the embodiments illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, structure is disclosed therein for achieving the welding of tubing 12 onto a plate 14, as, for example, in connection with the assembly of heat exchanger elements, such as those used in warm wall refrigerators and freezers, noted hereabove, refrigerators and refrigerator liners, evaporators, dehumidifiers and air conditioners.

The tubing 12, which is to be welded onto the plate 14, has a series of upset portions or projections 12a spaced along its length. Conventional resistance welding apparatus is employed having welding tips 16 and 17 which electrically connect with a commonly known welding transformer 18. In addition, the applicant's novel arrangement typically utilizes a back-up bar 20 for providing a current path during the welding operation.

In use, the back-up bar 20 is disposed on one side of the plate 14, while the tubing 12 is disposed on the opposite side of the plate 14. The welding tips 16 and 17 are disposed in engaging relationship with two of the upset portions 12a along the tubing 12. When the electrical circuitry for the resistance welding apparatus is energized, current flows, for example, from welding tip 16 through upset portion 12a of tubing 12, the plate 14, the back-up bar 20, back through the plate 14, and through the other upset portion 12a on the tubing 12 for a complete circuit.

With reference now to FIG. 2, an alternate welding technique is disclosed therein whereby the upset portions or projections 12a of the tubing 12 are individually disposed between welding tips 16 and 17, as well as the plate 14. In other words, the welding technique involves a welding tip 16, a projection 12a on tubing 12, the plate 14 to which the tubing 12 is to be welded, and another welding tip 17 disposed in line with the welding tip 16. The welding tips are electrically connected to one side of a welding transformer 18, as described hereabove in connection with FIG. 1.

When the aforesaid welding tips 16 and 17 are energized, a current path is created, for example, through the welding tip 16, the projection 12a on the tubing 12, the plate 14 and the other welding tip 17. In this regard, it might be noted that the welding tips 16 and 17 forming the electrodes for the system may be of standard configuration or, for example, may have a special shape to fit the contour of the projections of the tubing, or by reason of higher electrode pressure or current requirements.

With reference now to FIG. 3, an alternate welding technique is disclosed therein which utilizes indirect resistance welding in combination with the upset portions or projections 12a on the tubing 12. More specifically, in order to accomplish the welding of the tubing 12 onto the plate 14, the welding tip 16 is disposed in engagement with a projection 12a on the tubing 12 and the welding tip 17 is disposed alongside the tubing 12. Upon energization of the electrical circuit of which the welding tips 16 and 17 form a part, circuitry is completed through the welding tip 16, the upset portion or projection 12a on the tubing 12, and then through the plate 14 to the other welding tip 17. In other words, effective tubing to plate welding is accomplished by indirect resistance welding.

FIG. 4 discloses still a further alternate welding technique in accordance with the instant invention. In this example, and instead of using the welding tips 16 and 17 of the embodiments of FIGS. 1 to 3, inclusive, a welding wheel 22 is employed, and a circuit thereof typically comprises the aforesaid welding wheel 22, the upset portions or projections 12a on the tubing 12, the plate 14, and the back-up bar 20, with, of course, a welding transformer 18.

In use, the welding wheel 22 is caused to move along the tubing 12, in the direction of the arrow of FIG. 4, and, hence, to consecutively contact the upset portions or projections 12a on the latter. Energization of the welding circuitry results in a current flow through the upset portions or projections 12a on the tubing 12, the plate 14, and the back-up bar 20.

In any event, and considering the representative welding techniques discussed hereabove in connection with FIGS. 1 to 4, inclusive, the respective upset portions or projections 12a on the tubing 12 are consecutively welded onto the plate 14, where the welding heat causes the metal to flow, and, hence, the tubing 12 to come into intimate relationship with the plate 14. As further noted hereabove, a highly effective tubing to plate welding is achieved by the instant invention, one which not only is representative of good bonding, but one which, as well, provides a maximum heat transfer between the tubing and the plate.

It should be further understood that the applicant's new and novel welding technique and assembly may be carried out with a high degree of versatility. For example, welds may be accomplished linearly along the tubing 12 or, for example, in the instance of serpentine tubing, welding can be simultaneously accomplished on various passes of the latter. Moreover, in the instance of large assemblies and/or multiple numbers of tubing, the circuitry forming part of the instant welding technique can be enlarged as desired. Additionally, any welding can be effected through either manual or automatic operation. Accordingly, bearing in mind that the instant welding method and assembly is susceptible to changes within the spirit of the invention, the preceding description should be considered illustrative, and not as limiting the scope of the following claims.

I claim:

1. The method of welding tubing having a continuous upset portion therearound to a surface which comprises the steps of disposing said continuous upset portion against said surface, and passing current through said continuous upset portion and said surface to effect a weld between said tubing and said surface.

2. The method of welding tubing having at least two continuous upset portions therearound to a plate which comprises the steps of disposing said continuous upset portions against said plate, backing said plate with a bar, and passing current through a path defined by one of said continuous upset portions, said plate, said bar, another portion of said plate, and another of said continuous upset portions to effect a weld between said tubing and said plate at said continuous upset portions.

3. The method of welding tubing having a continuous upset portion therearound to a plate which comprises the steps of disposing said continuous upset portion against said plate, backing said plate with a bar, and passing current through a welding path principally defined by said continuous upset portion, said plate, said bar, and another portion of said plate to effect a weld between said tubing and said plate.

4. The method of welding tubing having a series of continuous upset portions therearound to a plate which comprises the steps of disposing said continuous upset portions against said plate, backing said plate with a bar, and selectively passing current through each of said continuous upset portions in a path defined by said continuous upset portion, said plate and said bar to effect a series of welds between said tubing and said plate.

References Cited in the file of this patent

UNITED STATES PATENTS

| | | |
|---|---|---|
| 2,306,772 | Benson | Dec. 29, 1942 |
| 2,333,600 | Trantvetter | Mar. 21, 1943 |